W. J. WARNER.
WATER HEATER.
APPLICATION FILED MAY 15, 1916.
1,256,852.
Patented Feb. 19, 1918.
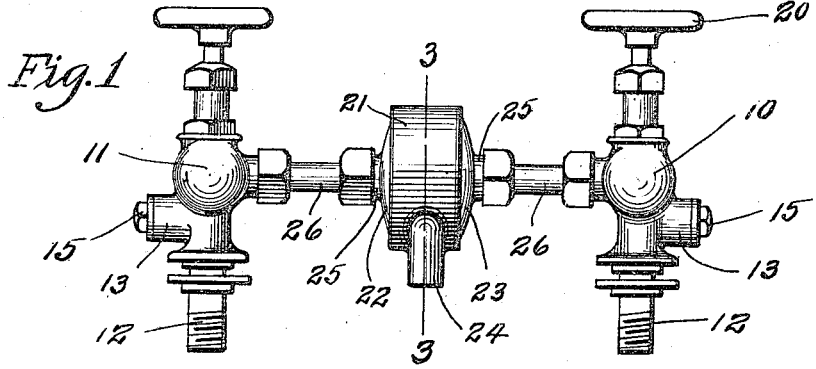
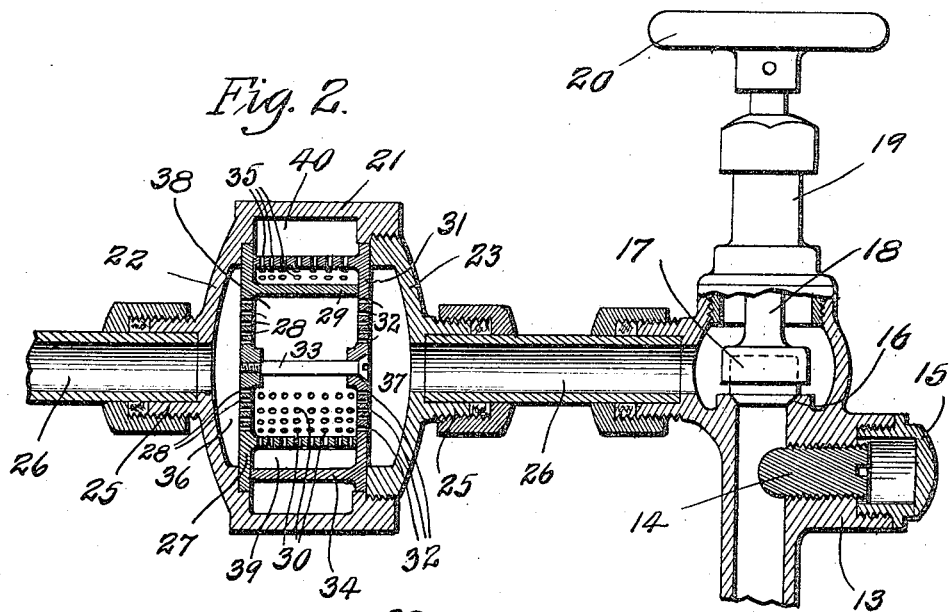
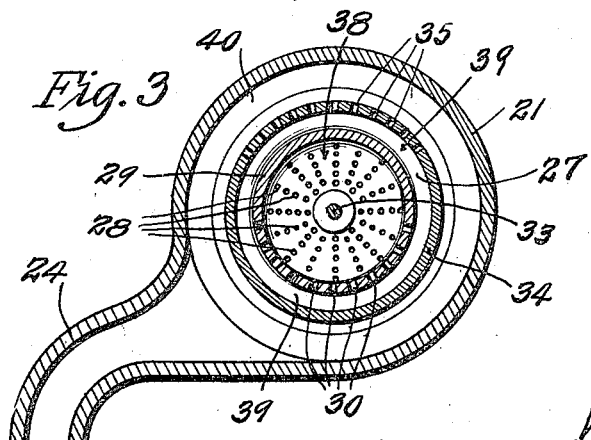
Inventor
Walter J. Warner
By ____, Atty.

UNITED STATES PATENT OFFICE.

WALTER J. WARNER, OF ST. LOUIS, MISSOURI.

WATER-HEATER.

1,256,852.                Specification of Letters Patent.          Patented Feb. 19, 1918.

Application filed May 15, 1916.  Serial No. 97,598.

*To all whom it may concern:*

Be it known that I, WALTER J. WARNER, a citizen of the United States, residing at St. Louis, Missouri, have invented a certain new and useful Improvement in Water-Heaters, of which the following is a full, clear, and exact description, such as will enable others skilled in the art to which it appertains to make and use the same, reference being had to the accompanying drawings, forming part of this specification.

My invention relates to a device particularly designed for heating water by the mixing therewith of live steam, the principal object of my invention being to provide a comparatively simple, economical and efficient water heating device which is applicable for use wherever live steam and water are available, and as said device is practically instantaneous in action, it is particularly desirable for use in bath and wash-rooms, kitchens, laundries, and for manufacturing purpose.

Further objects of my invention are to provide a water heater in the form of a mixing chamber which can be readily connected with the valves of steam and water supply pipes, said chamber being provided with a series of interiorly arranged walls, the same being perforated to form jet openings through which the water and steam must pass before finally discharging from the mixing chamber, and which arrangement is effective in thoroughly mixing and commingling the steam and water, and consequently heating the latter to the desired degree.

My present invention is an improvement on a similar device disclosed in an application for patent filed by me October 16, 1911, Serial No. 654,986.

With the foregoing and other objects in view, my invention consists in certain novel features of construction and arrangement of parts, hereinafter more fully described, claimed and illustrated in the accompanying drawings, in which—

Figure 1 is a front elevational view of a water heating device of my improved construction.

Fig. 2 is a vertical section taken through the center of the device and showing a portion of the water control valve in section.

Fig. 3 is an enlarged cross section taken approximately on the line 3—3 of Fig. 1.

Referring by numerals to the accompanying drawings, 10 and 11 designate respectively water and steam valve housings, the same being adapted for use in connection with a wash-basin, bath-tub, or the like, and depending from said housings are tubular extensions 12 to which are adapted to be connected water and steam supply pipes.

Formed integral with the lower portion of each valve housing is a laterally projecting tubular extension 13, the same being interiorly threaded in order to receive a screw-plug 14, the rounded inner end of which is adapted to project into the opening through the tubular extension 13 so as to control the size of the opening therethrough.

The outer end of the tubular extension 13 is normally closed by a screw-cap 15. Formed within each valve housing and preferably immediately above the screw-plug therein is a valve seat 16, upon which is adapted to rest a valve 17, the same being carried by the lower end of a stem 18 which is screw-seated in a tubular member 19. This member 19 is screw-seated in the upper portion of the corresponding valve housing and carried by the outer end of each stem 18 is a handle 20.

A hollow housing 21, preferably cylindrical in form, is positioned between valves 10 and 11, one side of said housing being permanently closed by a wall 22 and the other side being closed by a removable wall or plate 23. Leading from the chamber within housing 21 is an outlet 24, preferably in the form of a tubular spout.

The walls 22 and 23 are provided with outwardly projecting tubular extensions 25 and connected thereto in any suitable manner are the inner ends of tubular members 26, the outer ends of which are connected to valve housings 10 and 11 and have communication with the valve chambers therein.

Positioned within the housing 21 adjacent to wall 22, which latter is convex, is a plate 27, the same being perforated to form jet openings 28, and formed integral with or fixed to this plate and projecting toward plate 23 is a horizontally disposed annular wall or ring 29, a portion of which is perforated to form jet openings 30.

Positioned within the housing 21 and adjacent to the removable wall or plate 23, which latter is convex, is a plate 31, the same being perforated to form jet openings 32, and connecting the central portion of this plate with plate 27 is a screw 33.

Formed integral with or fixed to plate 31 is a horizontally disposed ring or annular wall 34, the same projecting toward plate 27 and a portion of this ring or wall is perforated to form jet openings 35.

By virtue of the construction just described, the chamber within housing 21 is divided into chambers 36 and 37 located respectively between the pairs of walls 22 and 27 and 23 and 31, a central chamber 38 within circular wall 29 and between the perforated plates 27 and 31, an annular chamber 39 between the rings or walls 29 and 34, and an annular chamber 40 between the circular wall of housing 21 and wall 34, and said last mentioned annular chamber being provided with the outlet 24.

It will be understood that when plates 27 and 31 are properly assembled or connected by screw 33, that the outer edge of wall 29 bears directly against plate 31 and that the outer edge of wall 34 bears directly against plate 27.

When the parts thus associated are inserted in the chamber within housing 21, the perforated portion of wall 34 is preferably located opposite the outlet 24 and the perforated portion of wall 29 is located opposite the perforated portion of wall 34. For this reason, the water and steam passing through the mixing chamber is caused to take a tortuous path from the central chamber 38 to the outlet 24.

In the use of my improved water heater, handle 20 of the water control valve 10 is manipulated to open or unseat said valve, thus permitting water to flow through water valve housing, and from thence through the tubular connection 26 connected thereto into chamber 37.

From said chamber the water passes through the apertures or perforations in plate 31, and is thus delivered in jet form into central mixing chamber 38. The handle 20 of steam control valve is now manipulated to open said valve, whereupon steam will pass through the steam valve housing and through the tubular member 26 connected thereto and pass from thence into chamber 36. From this chamber the steam will pass through the apertures 28 in plate 27 and thus be delivered in jet form into central mixing chamber 38 to commingle with and heat the water entering and passing therethrough.

The mixture of steam and water finds exit from central mixing chamber 38 through the perforations 30 in annular wall 29, and such mixture is delivered in jet form into annular chamber 39 from whence it finds exit through the perforations 35 in annular wall 34, it being understood that the last mentioned perforations are located on the opposite side of the annular chamber from the perforations 30.

The mixture of steam and water after being delivered into annular chamber 40 in jet form passes through said chamber and finds exit through outlet 24. The water and steam passing through the valve chambers within the device are very thoroughly mixed and commingled with the result that the water is quickly and effectively heated to the desired degree.

It will be understood that the volume of water and steam admitted to the mixing device is controlled by proper manipulation of the valve handles 20, and that the flow of water and steam to the valves is controlled by the adjustment of the screw plugs 14.

A water heating device of my improved construction is comparatively simple, can be easily and cheaply manufactured, can be readily assembled or taken apart, is efficient and economical in operation, and can be advantageously used wherever steam and water are available, and it is desired to quickly heat water.

It will be readily understood that minor changes in the size, form and construction of the various parts of my improved water heater can be made and substituted for those herein shown and described, without departing from the spirit of my invention, the scope of which is set forth in the appended claims.

I claim:

1. The combination with fluid supply pipes, of a housing connected to said pipes, a pair of perforated plates within said housing and disposed so as to form inlet chambers for the fluid. perforated rings between said plates, which rings form a central mixing chamber and a pair of annular mixing chambers, and the wall of said housing being provided with an outlet which leads from the outer one of said annular mixing chambers.

2. In a device of the class described, a housing provided with a pair of inlet openings and an outlet opening, and a series of perforated partitions within said housing and dividing the space therein into a pair of inlet chambers with which the inlet openings communicate, a centrally arranged mixing chamber, and a plurality of annular mixing chambers, one of which latter has communication with the outlet from the housing.

3. In a device of the class described, a housing provided with a pair of inlet openings and an outlet opening, and a series of perforated partitions within said housing and dividing the space therein into a pair of inlet chambers with which the inlet openings communicate, a centrally arranged mixing chamber, a plurality of annular mixing chambers, one of which latter has communication with the outlet from the housing fluid supply pipes leading to the inlet openings of said housing, and valves located in said supply pipes.

4. In a device of the class described, a housing provided with a pair of inlet openings and an outlet opening, and a series of perforated partitions within said housing and dividing the space therein into a pair of inlet chambers with which the inlet openings communicate, a centrally arranged mixing chamber, a plurality of annular mixing chambers, one of which latter has communication with the outlet from the housing, fluid supply pipes leading to the inlet openings of said housing, valves located in said supply pipes, and means for controlling the flow of fluid to said valves.

5. In a water heater, a housing having a pair of inlet openings and an outlet opening, a pair of perforated plates removably positioned within said housing and arranged in front of the inlet openings thereof to form a pair of inlet chambers, and walls arranged between said plates to form a centrally arranged mixing chamber and a plurality of annular mixing chambers, portions of which walls are perforated.

6. In a water heater, a housing having a pair of inlet openings and an outlet opening, a pair of perforated plates removably positioned within said housing and arranged in front of the inlet openings thereof to form a pair of inlet chambers, and walls arranged between said plates to form a centrally arranged mixing chamber and a plurality of annular mixing chambers, portions of which walls are perforated, and the perforated portion of one wall being oppositely disposed with respect to the perforated portion of the other wall.

7. In a water heater, a housing having a pair of inlet openings and an outlet opening, partitions within said housing for dividing the space therein into a pair of inlet chambers, a central mixing chamber, and a pair of annular mixing chambers and portions of all of which partitions are provided with jet openings.

8. In a water heater, a housing having a pair of inlet openings and an outlet opening, partitions within said housing for dividing the space therein into a pair of inlet chambers, a central mixing chamber, and a pair of annular mixing chambers portions of all of which partitions are provided with jet openings, steam and water supply pipes leading to the inlet openings in said housing, and valves located in said supply pipes.

9. In a device of the class described, a housing having a pair of inlet openings and an outlet opening, partitions within said housing for dividing the space therein into a pair of inlet chambers, a central mixing chamber and a pair of annular mixing chambers, portions of all of which partitions are provided with jet openings, fluid supply pipes leading to the inlet openings in said housing, valves located in said supply pipes, and means for regulating the flow of water to said valves.

10. In a device of the class described, a housing provided with a pair of inlet openings and an outlet opening, a pair of perforated plates removably positioned within said housing to form a pair of inlet chambers with which the inlet openings communicate, and concentric walls arranged between said plates to form a centrally disposed mixing chamber and a pair of annular mixing chambers, portions of which walls are perforated to form jet openings.

11. In a fluid mixing device, the combinatiton with conduits for supplying the fluids to be mixed, of a housing to which the conduits are connected, said housing being provided with an outlet, and foraminous partitions within said housing, said partitions being disposed so as to divide the space in said housing into a pair of inlet chambers, a primary mixing chamber and a plurality of secondary mixing chambers, one of which latter communicates with the outlet from the housing and the foraminous portions of said partitions being disposed so as to cause the fluids passing through the housing to traverse a tortuous path.

In testimony whereof I hereunto affix my signature in the presence of two witnesses, this 11th day of May, 1916.

WALTER J. WARNER.

Witnesses:
M. P. SMITH,
M. A. HANDEL.

Copies of this patent may be obtained for five cents each, by addressing the "Commissioner of Patents, Washington, D. C."